US012757921B2

(12) United States Patent
Swanson

(10) Patent No.: US 12,757,921 B2
(45) Date of Patent: Oct. 13, 2026

(54) PASTRY MOLD RECEPTACLE WITH GRADUATED MARKINGS TO MEASURE, SHAPE, AND COMBINE INGREDIENTS

(71) Applicant: LeAnn Swanson, Peachtree City, GA (US)

(72) Inventor: LeAnn Swanson, Peachtree City, GA (US)

( * ) Notice: Subject to any disclaimer, the term of this patent is extended or adjusted under 35 U.S.C. 154(b) by 303 days.

(21) Appl. No.: 18/529,548

(22) Filed: Dec. 5, 2023

(65) Prior Publication Data

US 2025/0176605 A1 Jun. 5, 2025

(51) Int. Cl.
*A23P 30/10* (2016.01)
*A21C 11/10* (2006.01)

(52) U.S. Cl.
CPC ............ *A23P 30/10* (2016.08); *A21C 11/106* (2013.01)

(58) Field of Classification Search
CPC ........ A23P 30/10; A21C 11/106; A21C 9/045
See application file for complete search history.

(56) References Cited

U.S. PATENT DOCUMENTS

2015/0327709 A1* 11/2015 Peers ...................... A23P 30/10 99/426
2021/0244036 A1* 8/2021 Turner .................. A21C 15/04
2023/0073336 A1* 3/2023 Plichon .................. A47J 43/20

* cited by examiner

*Primary Examiner* — Thomas M Hammond, III
(74) *Attorney, Agent, or Firm* — J.T. Hollin, Attorney at Law, P.C.

(57) ABSTRACT

An inventive concept discloses a container comprising a receptacle for assembling and preparation of edible food ingredients. In the preferred embodiment, the receptacle is constructed of a clear rigid material, oriented vertically upright, with sequentially and orthogonally-joined, peripheral faces or walls. The joined walls create a hollow upper opening and a corresponding hollow lower opening. The peripheral walls further display vertical measurement indicators, shown as both vertical quarter-inch increments and quarter-centimeter increments. Both sets of markings may be impressed, marked, or engraved on the outer surfaces of the faces/walls, to serve as pre-determined fill levels. The incremental markings may also be supplemented by corresponding parallel, horizontal ridges protruding from the interior surfaces of the faces or walls.

11 Claims, 3 Drawing Sheets

Figure 1:
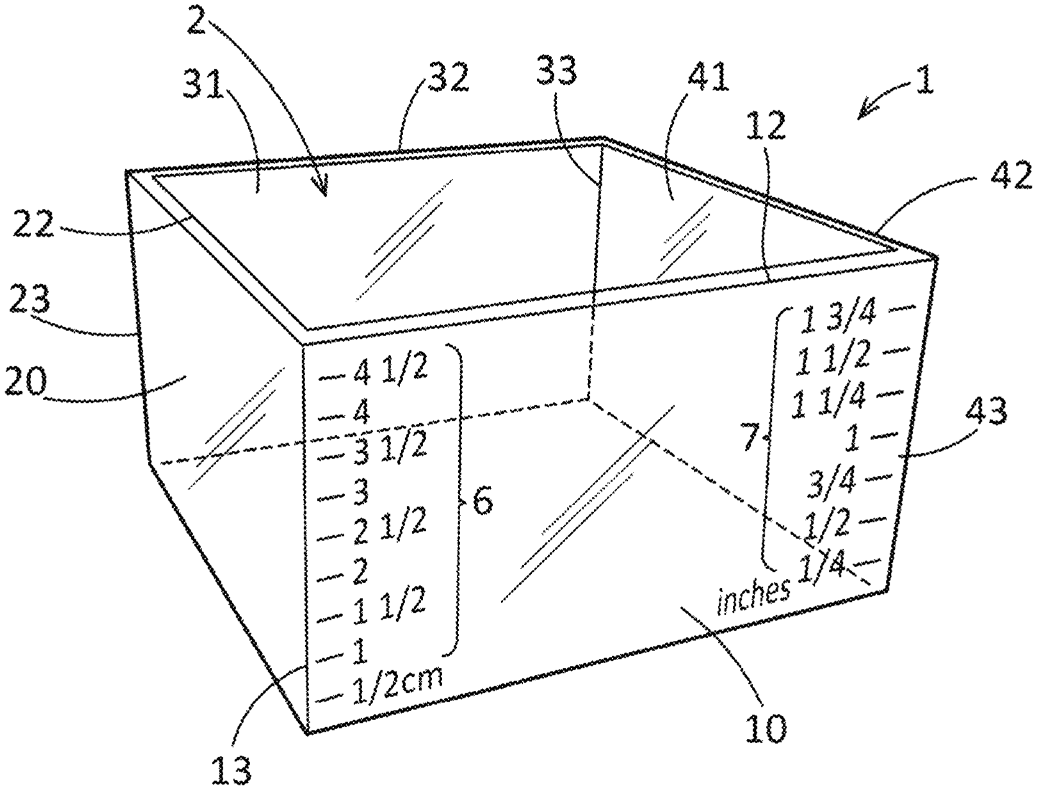

PASTRY MOLD RECEPTACLE WITH GRADUATED MARKINGS TO MEASURE, SHAPE, AND COMBINE INGREDIENTS

CROSS-REFERENCES TO RELATED APPLICATIONS

Not applicable,

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION (1) Field of the Invention

The field of the present inventive concept relates generally to methods, devices, and utensils utilized for the preparation of pastries, desserts, and gourmet items in a kitchen, particularly where accurate measuring of various quantities of ingredients is required. Many types of foods are prepared and placed into a pan or container as a preliminary step prior to arriving at the final form, texture, and content of the food being prepared. A chef, baker, or home kitchen enthusiast typically employs a pan which may be fabricated from a particular metal, glass, or a ceramic material to cook or provide a desired shape of the food being prepared.

(2) Description of the Related Art, including information disclosed under 37 CFR 1.97 and 1.98.

CN109431296A; Dec. 21, 2018; Guangdong Sunrise Houseware; The present invention discloses a cake pan, including baking tray ontology, equipped with position line on the inside of the baking tray ontology. It further includes the production method of cake pan of the present invention. The invention has the following advantages; structure is simple, production cost is low, production firm is according to the order of trade debtor, trade debtor oneself provides corresponding cake recipes, provide different cake pan blanking dosages, the position of corresponding position line is provided on the inside of baking tray ontology, the cake recipes that cake user then provides according to trade debtor, cake mix is poured into baking tray ontology, it is added to the position line, thus facilitate cake user to control blanking dosage, makes the complete cake appearance.

U.S. Published Patent Application #2010/0297310 A1; Nov. 25, 2010; Garbe et al

A tray configured to contain a food product is described. The bottom surface of the tray includes a flow restricting element which restricts the flow of the food product in the tray. The flow restricting element may include one or more elongated ridges that protrude from the bottom surface of the tray. The flow restricting element may also include a raised pattern on the bottom surface of the tray. By restricting the flow of the food product in the tray, the flow restricting element may reduce or eliminate slippage or slumping of the food product When the tray is placed in a non-horizontal position. Also described is a packaged food product including a tray which contains a dough. The packaged food product is capable of being displayed in a non-horizontal configuration with little or no slumping of the food product.

U.S. Published Patent Application #2004/0011690 A1; Jan. 22, 2004; Marfino et al; A baking device is adapted to facilitate slicing of a baked item into precisely measured portions. The baking device comprises a conventional baking pan having a horizontal bottom wall and at least one upright peripheral wall, and measurement indicia. Measurement indicia are delineated on inner surfaces of the peripheral wall.

AU 2007216772 A1; Sep. 13, 2007; Martin, Ross, Scoville, Gavie; The invention also relates to a method for providing individually baked products comprising the steps of providing an uncooked dough sheet or block which has separable portions of predefined shape, separating one or mor portions from the sheet or block and then baking the portions to obtain individually baked products.

U.S. Published Patent Application #2010/0326250 A1; Part, Becky; A container or pan for producing predetermined food portions is disclosed. Indicia are formed on the container at 1-1. selected intervals adjacent an outer peripheral edge. A cutting blade is provided having a length substantially equivalent to a length, or a width, or a diameter of the container, or to a distance between a pair of cooperating indicia. The cutting blade is adapted to extend from the indicia on one side of the container to the indicia on another side of the container. The cutting member is placed in alignment with the respective indicia and then forced downwardly through the food. The indicia provide a guide to readily align the cutting blade for cutting the food into selected sized portions without having to measure and mark the food prior no cutting.

U.S. Published Patent Application #2009/01010245 A1; Apr. 23, 2009; Penson. The present invention is an improved pan comprising a substrate connected to one end of sidewalls and the side walls are connected together resulting in a pan that has a hollow cavity for containing food product wherein measurement markings appear on other end of at least two of the side walls. The present invention also includes method of making and method of using the improved pan.

BRIEF SUMMARY OF THE INVENTVE CONCEPT

The inventive concept disclosed herein is concerned with the preparation of food and dessert items, particularly delicate pastry items often found in French cuisine or multi-layered, unique desserts. In commercial baking or restaurant operations, consistency in the component portions is a requirement in arriving at the quality, flavor, texture, and shape of many upscale desserts.

In the area of French or European cuisine, the chef or dessert preparer may work from recipe instructions which require that a variety of pastry molds, crémes, viscous liquids, or mixture(s) be placed in a cooking or preparation receptacle. The ingredients may be described in either measured quantities, or pouring levels in a container, and layered in a sequential manner.

The disclosed inventive concept relates to a container comprising a receptacle in which edible food ingredients may be measured, shaped, and/or combined within the device. In the preferred embodiment, the device is constructed of a clear rigid material, oriented vertically upright, with sequentially joined, peripheral faces or walls. In the preferred embodiment, the joined walls create a hollow upper opening and a corresponding hollow lower opening.

In certain circumstances, the lower opening may instead, consist of a solid material adjoined to the bottoms of each of the peripheral walls or faces.

The peripheral walls further display vertical measurement indicators. The measurement indicators are displayed in both quarter-inch increments and quarter-centimeter increments. Both sets of markings may be impressed, marked, or engraved on the outer surfaces of the faces/walls to serve as pre-determined fill levels. In other embodiments, the incremental markings may also be supplemented by horizontal ridges protruding from the interior surfaces of the faces or walls. A user prepares a particular food item in accordance with a recipe or food preparation procedure.

BRIEF DESCRIPTION OF THE VIEWS OF DRAWINGS AS EXEMPLARY EMBODIMENTS OF THE INVENTIVE CONCEPT

FIG. 1 is a perspective view of the basic pastry mold 1 further showing, on the first outer face 10, a vertically incremental quarter-centimeter scale 6 and a vertically incremental quarter-inch scale 7.

Figure 2:
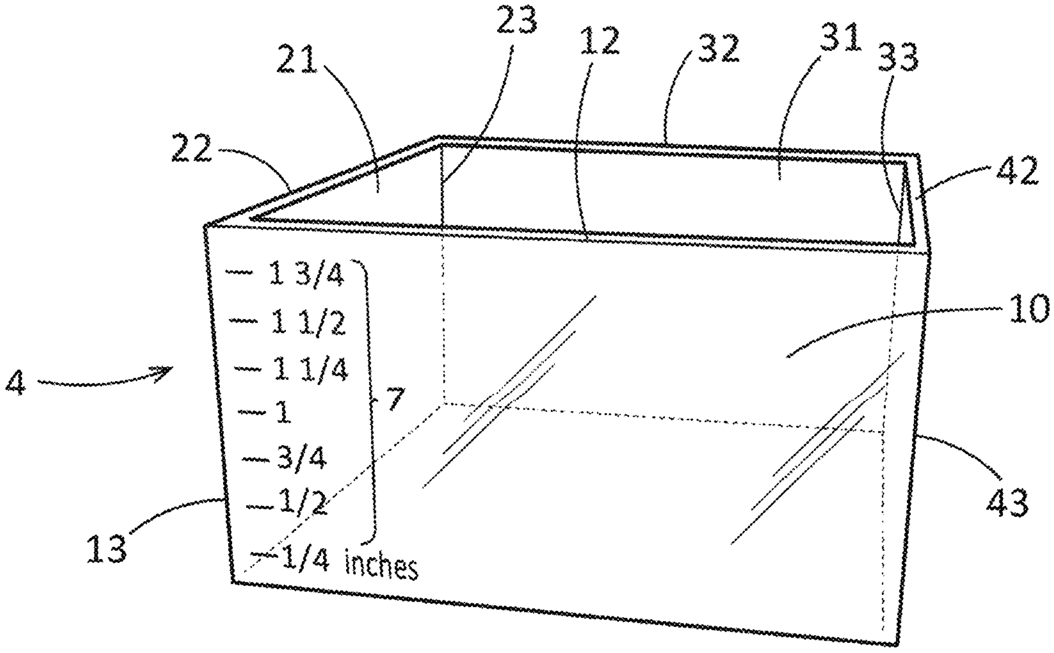

FIG. 2 displays a view of the first face 10 of an opposed-scale pastry mold 4 embodiment, displaying a single vertically incremental inch scale 7.

Figure 3:
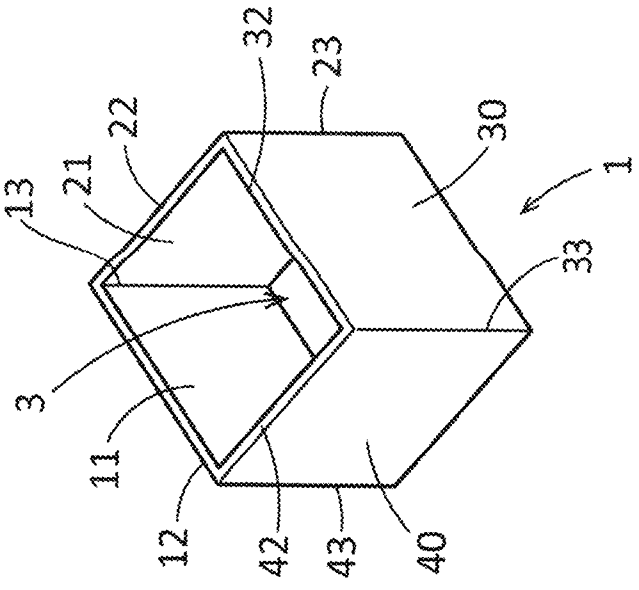

FIG. 3 is a compacted, and horizontally rotated view of the basic pastry mold 1, showing the orientation of the inner faces 11, 21, and outer faces 40, 30.

Figure 4:
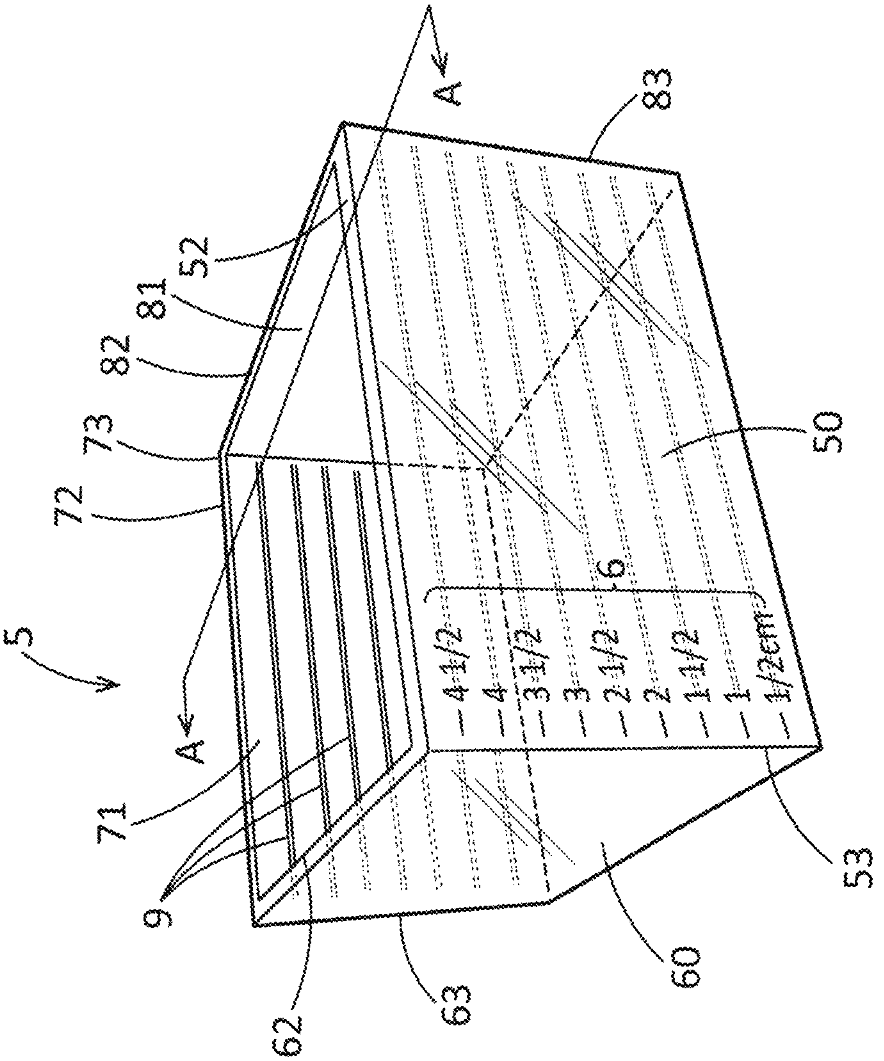

FIG. 4 illustrates an embodiment, referred to as a ridged pastry mold 5, with its first outer wall 50 displaying a vertically incremental centimeter scale 6. Further shown is the orientation and placement of a section line A-A.

Figure 5:
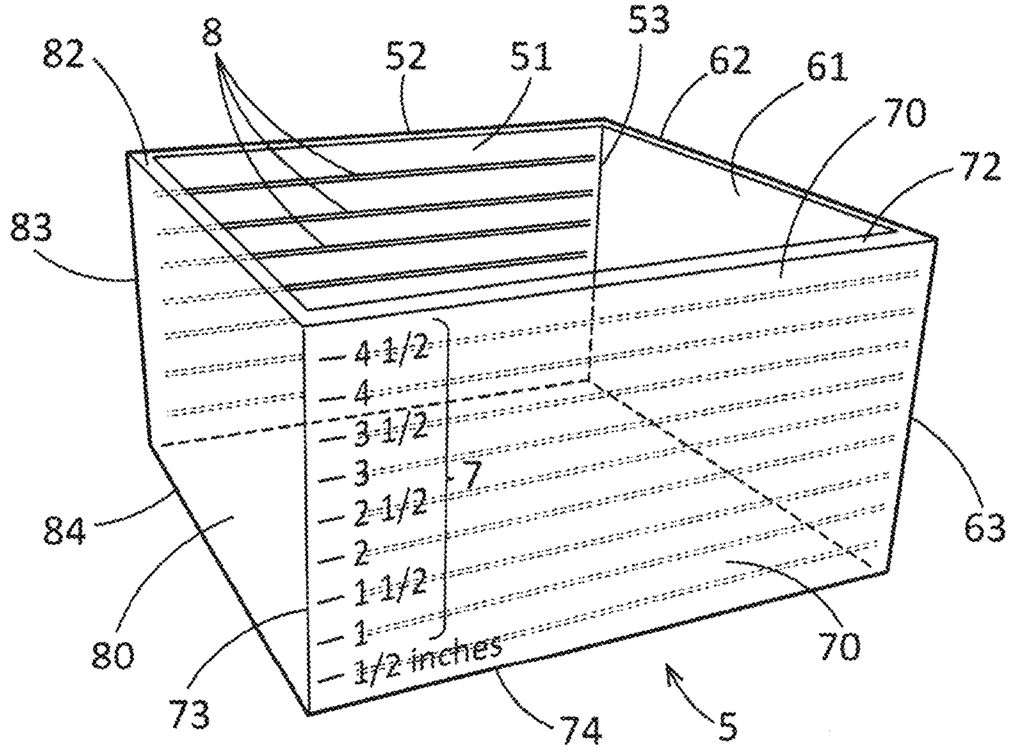

FIG. 5 presents a perspective view of the ridged pastry mold 5, as rotated horizontally, 180 degrees from the view shown in FIG. 4, thereby showing a view of a vertically incremental inch scale 7 that is utilized on the ridged pastry mold 5.

Figure 6:
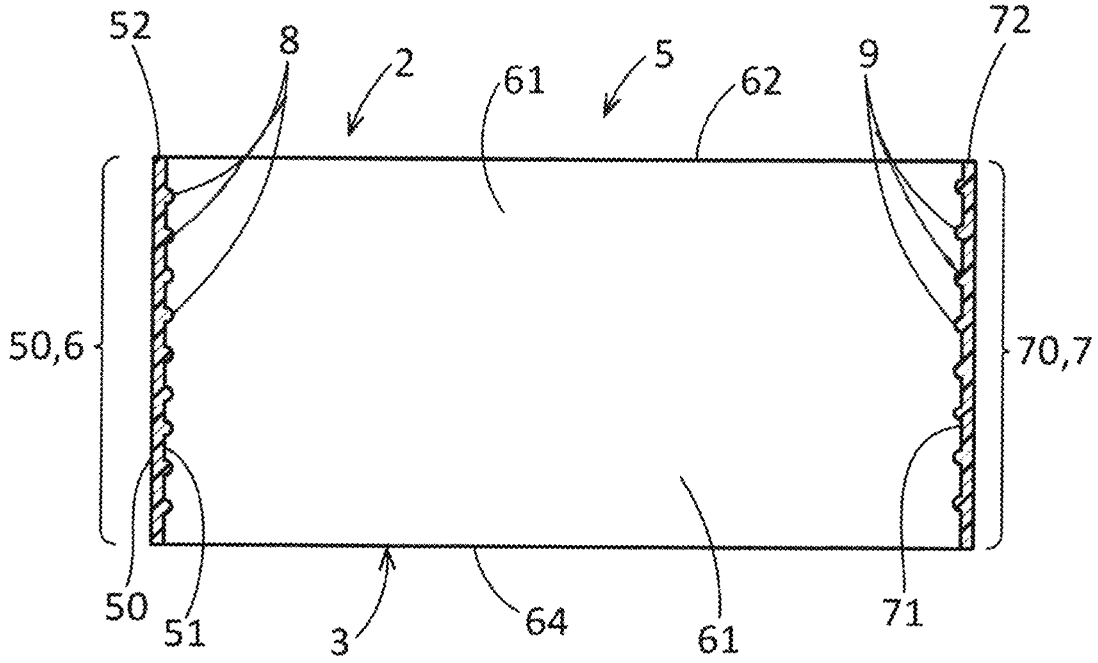

FIG. 6 is a cross-sectional view of the ridged pastry mold 5 as seen from the perspective of section line A-A of FIG. 4.

| Table of Nomenclature & Part Numbers of Invention |
|---|
| 1. Basic pastry mold |
| 2. Upper area |
| 3. Lower area |
| 4. Opposed-scale pastry mold |
| 5. Ridged pastry mold |
| 6. Vertical incremental centimeter scale |
| 7. Vertical incremental inch scale |
| 8. Quarter-centimeter ridge |
| 9. Quarter-inch ridge |
| 10. First outer face |
| 11. First inner face |
| 12. First rim |
| 13. First corner |
| 14. First bottom edge |
| 15.-19. n/a |
| 20. Second outer face |
| 21. Second inner face |
| 22. Second rim |
| 23. Second corner |
| 24. Second bottom edge |
| 25.-29. n/a |
| 30. Third outer face |
| 31. Third inner face |
| 32. Third rim |
| 33. Third corner |
| 34. Third bottom edge |
| 35.-39. n/a |
| 40. Fourth outer face |
| 41. Fourth inner face |
| 42. Fourth rim |
| 43. Fourth corner |
| 44. Fourth bottom edge |
| 45.-49. n/a |
| 50. First outer wall |
| 51. First inner wall |
| 52. Top rim A |
| 53. Corner A |
| 54. Bottom rim A |
| 55.-59. n/a |
| 60. Second outer wall |
| 61. Second inner wall |
| 62. Top rim B |
| 63. Corner B |
| 64. Bottom rim B |
| 65.-69. n/a |
| 70. Third outer wall |
| 71. Third inner wall |
| 72. Top rim C |
| 73. Corner C |
| 74. Bottom rim C |
| 75.-79. n/a |
| 80. Fourth outer wall |
| 81. Fourth inner wall |
| 82. Top rim D |
| 83. Corner D |
| 84. Bottom rim D |

-continued

DETAILED DESCRIPTION OF THE INVENTION

The objects, features, and advantages of the inventive concept presented in this application are more readily understood when referring to the accompanying drawings. The drawings, totaling six figures, show the basic components and functions of embodiments and/or methods of use. In the several figures, like reference numbers are used in each figure to correspond to the same component as may be depicted in other figures.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The characterizations of various components and orientations described herein as being "vertical," "horizontal," "upright", "right", "left", "side," "top", or "bottom" designate directions in the drawings to which reference is made and are relative characterizations only based upon the particular position or orientation of a given component as illustrated. These terms shall not be regarded as limiting the invention. The words "downward" and "upward" refer to position in a vertical direction relative to a geometric center of the apparatus of the present invention and/or designated parts thereof. The terminology includes the words above specifically mentioned, derivatives thereof and words of similar import.

The discussion of the present inventive concept will be initiated with FIG. 1, which illustrates a perspective view of the basic pastry mold 1. The basic pastry mold 1 is generally constructed with a square horizontal contour, further comprising four vertical outer faces, being, clockwise, a first outer face 10, second outer face 20, third outer face 30 and fourth outer face 40. Each vertical outer face has a corresponding vertical inner face, being a first inner face 11, a second inner face 21, a third inner face 31, and a fourth inner face 41.

The basic pastry mold 1 also comprises a first rim 12, a second rim 22, a third rim 32, and a fourth rim 42 in conjunction with each of the outer faces 10, 20, 30, 40. The four vertical outer faces 10, 20, 30, 40 intersect, sequentially, at a first corner 13, a second corner 23, a third corner 33, and a fourth corner 43. In the preferred embodiment, the upper area 2 is a square-dimensioned, hollow, empty space, as well as the lower area 3 being a hollow, empty space, having corresponding dimensions. In other configurations, the square lower area 3 may be modified and covered by a solid material compatible with the outer vertical faces 10, 20, 30, 40.

In FIG. 1, the first outer face 10 of the basic pastry mold 1 is the predominant surface shown. There is displayed a vertically incremental centimeter scale 6 arranged in quarter-centimeter increments on the first outer face 10, proximate the first corner 13 of the pastry mold 1. Further shown, on the first outer face 10, is a vertically incremental inch scale 7 arranged in quarter-inch increments proximate the fourth corner 43 of the basic pastry mold 1

In the preferred embodiment the basic pastry mold 1 comprises a clear, rigid plastic, glass, or other suitable transparent, rigid material. However, in certain embodiments, the pastry mold 1 may be comprised of a solid translucent or opaque material. It is to be noted that the incremental measurement indicators depict vertical heights or fill levels, rather than a specific quantity or volume of an ingredient.

As a background regarding the use of the inventive concept, a chef or cook, during the preparation of certain recipes, may utilize the basic pastry mold 1 as a cutting tool. By using either the four upper rims 12, 22, 32, 42 or the four lower rims 14, 24, 34, 44, and exerting slight downward pressure on the rims or bottom edges, the chef may precisely cut, from a prepared sheet of pastry, at least one square-shaped segment of the pastry for eventual arrangement and/or placement atop or underneath other components of edible ingredients to be included within the basic pastry mold 1.

FIG. 2 displays a view of an alternative embodiment, referred to as an opposed-scale pastry mold 4. The view shown in FIG. 2 of the opposed-scale pastry mold 4 displays a vertically incremental inch scale 7 arranged vertically on the first outer face 10, proximate the first corner 13 of the opposed-scale pastry mold 4. A centimeter scale 6 does not appear on the first outer face 10, but instead, is affixed or inscribed upon the third outer face 30 (not in view). A vertically incrementally centimeter scale is placed directly upon the leftmost side of the third outer face 30 proximate the third corner 33 of the opposed-scale pastry mold 4.

The embodiment shown in FIG. 2 provides separation and placement of the vertical centimeter scale 14 and inch scale 34, respectively, onto two different outer faces 10, 30, being oriented 180 degrees from one another, the outer faces 10, 30 also being parallel to each other.

FIG. 3 is a compacted, perspective view of the basic pastry mold 1, having been horizontally rotated one hundred-eighty degrees. FIG. 3 thereby shows a different view of the orientation and positioning of two of the inner faces 11, 21 and two of the outer faces 40, 30 of the basic pastry mold 1.

FIG. 4 illustrates a third embodiment, termed a ridged pastry mold 5. The ridged pastry mold 5, similarly to the basic pastry mold 1, is generally constructed with a square horizontal contour having four vertical outer walls. The four vertical walls, shown clockwise in FIG. 4, are a first outer wall 50, second outer wall 60, third outer wall 70 (out of view), and a fourth outer wall 80 (out of view). Each vertical outer wall has a corresponding vertical inner wall, being a first inner wall 51 (out of view), a second inner wall 61 (out of view), a third inner wall 71, and a fourth inner wall 81.

The ridged pastry mold 5 further comprises four upper rims, being a top rim A 52, a top rim B 62, a top rim C 72, and a top rim D 82, corresponding to each of the outer walls 50, 60, 70, and 80. The four vertical outer walls 50, 60, 70, 80 intersect, sequentially at corner A 53, corner B 63, corner C 73, and corner D 83. The upper area 2, in the preferred embodiment, is a square-dimensioned hollow space, as well as a square lower area 3 (not in view) also being hollow and having corresponding dimensions.

In certain configurations, the square lower area 3 may be modified and covered by a section of solid material that is compatible with the vertical walls. The disclosed device may be used with a preparation technique consisting of placing certain food ingredients within the pastry mold 1 up to pre-determined fill levels.

Prominently shown in FIG. 4 is the first outer wall 50 of the ridged pastry mold 5, displaying a vertically incremental centimeter scale 6 engraved or marked onto the leftmost side of the first outer wall 50, proximate corner A 53. Although not in view, the third outer wall 70 of the ridged pastry mold 5 displays a vertically incremental inch scale 7 engraved or marked onto the leftmost side of the third outer wall 70, proximate corner C 73. It is further noted that the partial view of the third inner wall 71, makes visible several of a series of parallel, symmetrically spaced quarter-inch ridges 9, each extending from corner B 63 to corner C 73 of the ridged pastry mold 5.

The vertical spacing between the quarter-inch ridges 9 on the third inner wall 71 correspond to the vertically incremental inch scale 7 on the third outer wall 70. The quarter-inch ridges 9 serve to guide a user in pouring or inserting ingredients up to a certain prescribed interior fill level, cited in increments of quarter-inches.

Further, in FIG. 4, as indicated by parallel broken lines, it is noted that the first inner wall 51 comprises a series of parallel, symmetrically spaced quarter-centimeter ridges 8, each extending from corner A 53 to corner B 63 of the ridged pastry mold 5. The quarter-centimeter ridges 8 serve to guide a user in pouring or inserting ingredients up to a certain prescribed interior fill level of the ridge pastry mold 5, as provided for in increments of quarter-centimeters FIG. 4 also illustrates section line A-A, indicating the orientation of a sectional view of the ridged pastry mold 5, the sectional view being shown in FIG. 6.

FIG. 5 presents a view of the ridged pastry mold 5 of FIG. 4, having been rotated 180 degrees horizontally. Prominently shown in FIG. 5 is the third outer wall 70 of the ridged pastry mold 5, displaying a vertically incremental inch scale 7 engraved or marked onto the leftmost side of the third outer wall 70, proximate corner C 73. It is further noted that a partial view of the first inner wall 51, renders partially visible a series of parallel, symmetrically spaced quarter-centimeter ridges 8, each extending from corner D 83 to corner A 53 of the ridged pastry mold 5.

FIG. 6 is a cross-sectional view of the ridged pastry mold 5 as seen from the perspective of section line A-A. The flat second interior wall 61 of the ridged pastry mold 5, along with its top rim B and bottom rim B 64 are also shown. The leftmost side of FIG. 6 displays the cross-sectional profiles of the series of parallel, symmetrically spaced quarter-centimeter ridges 8, each extending from corner D 83 to corner A 53 of the ridged pastry mold 5.

The rightmost side of FIG. 6 displays the cross-sectional profiles of the series of parallel, symmetrically spaced quarter-inch spaced ridges 9, each extending from corner D 73 to corner B 63 of the ridged pastry mold 5.

In other embodiments of this inventive concept, the peripheral walls or faces may instead, consist of one continuous, circular, or elliptically-contoured wall. Similarly, there may be provided exterior vertically incremental measurement indicators to depict vertical heights or fill levels, rather than a specific quantity or volume of an ingredient.

While preferred embodiments of the present inventive method have been shown and disclosed herein, it will be obvious to those persons skilled in the art that such embodiments are presented by way of example only, and not as a limitation to the scope of the inventive concept. Numerous variations, changes, and substitutions may occur or be suggested to those skilled in the art without departing from the intent, scope, and totality of this inventive concept. Such variations, changes, and substitutions may involve other features which are already known per se and which may be used instead of, in combination with, or in addition to features already disclosed herein. Accordingly, it is intended that this inventive concept be inclusive of such variations, changes, and substitutions, as described by the scope of the claims presented herein.

What is claimed is:

1. A pastry mold device for measuring, shaping, placement and arrangement of desired proportions of any of a plurality of edible ingredients within the device, thereby enabling the preparation of certain food items, the device comprising:

an oblong, rigid container, oriented so as to have, a first wall, a second wall, a third wall, and a fourth wall, the walls sequentially joined to each other at four successive vertical corners, the container thereby forming a square, upper area and a correspondingly-dimensioned square, lower area, wherein (a) the first wall of the container displays (i) vertically incremental centimeter markings on its outer left corner, and (ii) a plurality of horizontal ridges protruding a distance outward from the inner surface of the first wall, and (iii) each horizontal ridge separated from its adjacent ridge in equal increments measured in centimeters; and (b) the third wall parallel to the first wall, displays (i) vertically incremental markings, in inches, proximate its outer left corner, (ii) a plurality of horizontal ridges protruding a distance outward from the inner surface of the third wall, and (iii) each horizontal ridge separated from its adjacent ridge in equal increments measured in inches.

2. The pastry mold device of claim 1, wherein the square upper area is hollow, empty space and the square lower area is hollow, empty space.

3. The pastry mold device of claim 1, wherein each of the four vertical walls is constructed of a rigid, transparent material.

4. The pastry mold device of claim 1, wherein each of the four vertical walls is constructed of a rigid, translucent material.

5. The pastry mold device of claim 1, wherein the square lower area is closed by means of solid material mutually adjoining the bottom edge of each the vertical walls.

6. A method for preparation of specific pastry or dessert items by use of a single device for measuring, shaping, and arrangement of desired proportions of any of a plurality of edible ingredients, the method comprising the steps of:

(a) constructing an oblong, rigid container having a first face, a second face, a third face, and a fourth face, the faces sequentially joined to each other at four successive vertical corners, the container thereby forming a hollow, square upper area and a correspondingly-dimensioned hollow, square lower area;

(b) providing a plurality of vertically incremental centimeter markings proximate the outer left corner of the first face of the container, wherein each of the plurality of vertically incremental centimeter markings are parallel to each other and comprise a horizontal ridge protruding a distance outward from the inner surface of the first face;

(c) providing a plurality of vertically incremental inch markings proximate the outer right corner of the third face, wherein each of the plurality of vertically incremental inch markings are parallel to each other and comprise a horizontal ridge protruding a distance outward from the inner surface of the third face;

(d) in accordance with a recipe or procedure, measuring, shaping, and inserting of certain edible ingredients, up to pre-determined fill levels within the device.

7. The method of claim 6, wherein the square upper area is hollow, empty space and the square lower area is hollow, empty space.

8. The method of claim 6, wherein each of the four vertical faces is constructed of a rigid, transparent material.

9. The method of claim 6, wherein each of the four vertical faces is constructed of a rigid, translucent material.

10. The method of claim 6, wherein the square lower area is closed by means of a section of solid material mutually adjoining the bottom edge of each the vertical faces.

11. The method of claim 6, wherein (a) providing the plurality of vertically incremental centimeter markings further comprises separating each horizontal ridge from its adjacent ridge in equal increments measured in quarter-centimeters; and (b) providing the plurality of vertically incremental inch markings further comprises separating each horizontal ridge from its adjacent ridge in equal increments measured in quarter-inches.

* * * * *